Figure 1:
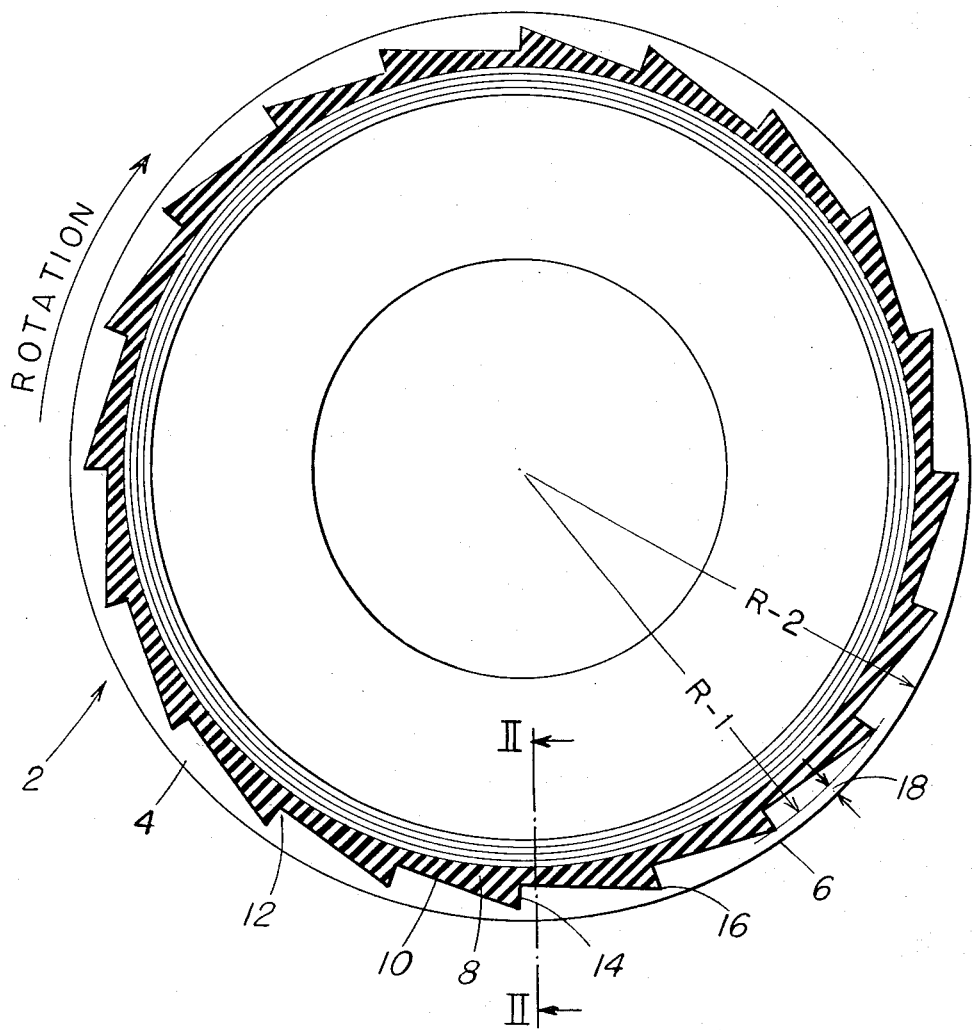

United States Patent [19]
Abplanalp

[11] 3,773,283
[45] Nov. 20, 1973

[54] SELF ROTATING AIRPLANE TIRE

[76] Inventor: Robert Henry Abplanalp, 700 Nepperhan Ave., Bronxville, N.Y. 10703

[22] Filed: Mar. 22, 1972

[21] Appl. No.: 237,113

[52] U.S. Cl............................................. 244/103 S
[51] Int. Cl............................................. B64c 25/40
[58] Field of Search...................... 244/103 S, 103 R

[56] References Cited
UNITED STATES PATENTS
2,377,638   6/1945   Lueck............................. 244/103 S
2,403,309   7/1946   Smith............................. 244/103 S FOREIGN PATENTS OR APPLICATIONS
1,160,467   7/1958   France............................ 244/103 S
1,422,320   11/1965  France............................ 244/103 S Primary Examiner—Milton Buchler
Assistant Examiner—Paul E. Sauberer
Attorney—James W. Bock

[57] ABSTRACT

An aircraft tire is provided with circumferential grooves in the tread face, which grooves include as the floor thereof a series of impeller vanes defined by asymmetrical wedges which present differential resistance to the airstream at vertically opposed locations on the tire to cause the tire to be rotated by the airstream.

9 Claims, 2 Drawing Figures

PATENTED NOV 20 1973  3,773,283

SELF ROTATING AIRPLANE TIRE

The invention is concerned with an aircraft tire which is provided with means to cause it to rotate when exposed to the airstream.

It is well-known that aircraft tires are subject to a great deal of stress, wear and heating at the moment of touchdown. Starting with essentially no rotational velocity, aircraft wheels must be rapidly accelerated by frictional contact with the runway to a circumferential velocity equal to the high landing speeds of modern aircraft. Since some aircraft land at velocities on the order of 150 miles per hour, the wheel acceleration involved is quite substantial. The frictional accelerating force occurs simultaneously with the imposition of high wheel forces due to the mass of the landing aircraft. Some consequences of this sudden acceleration are slip or scuffing resulting in uneven tire wear, rapid heat buildup within the tire, and danger of skidding. The scuffing of the tire and heat buildup caused by the rotational acceleration during landings significantly shortens the life of the tire. The stress occasioned by the acceleration of the aircraft wheel and tire is ultimately transmitted to the landing gear, requiring that it sustain this stress in addition to the others of landing.

Various means have been proposed for attempting to impart spin to aircraft wheels prior to touchdown. Some techniques for causing tire rotation are disclosed in U. S. Pat. No. 3,233,849 issued to Rubin and No. 2,435,801 issued to Shively. The disclosed techniques include providing flaps or pockets on the tire sidewall which trap air and thereby cause tire rotation when the tire is exposed to the airstream. U. S. Pat. No. 2,417,466 issued to Brewer teaches forming flaps or pockets incorporated into the tread face of the tire. U. S. Pat. No. 3,532,147 to Gough et al describes an aircraft tire having a plurality of circumferential grooves in the tread face with the surface contacting faces of the tread being provided with recesses or pockets having water outlets leading to the circumferential grooves. The Gough et al tire is designed to be rotated by water, through the utilization of a turbine-like effect if the tire skids or aquaplanes in landing on a wet runway.

It is the object of this invention to provide an improved aircraft tire which self-rotates when exposed to the airstream, which otherwise equals the performance of ordinary aircraft tires, and which is easily molded on conventional equipment.

The tire herein disclosed avoids the uneven heat buildup in the tire sidewall occasioned by the varying thickness and heat transfer characteristics inherent in flaps on the sidewall. Since the tire of the present invention has a conventional runway contacting tread face, it will be as quiet and vibrationless in operation as conventional aircraft tires. Unlike tires having interrupted tread faces, the tire of the subject invention provides adhesion equal to conventional aircraft tires lacking self-rotating features. The capability of self-rotation will be retained undiminished throughout the useful life of the tire because the rotation imparting means are not in wearing contact with the runway surface. As the tread surface wears, the self-rotation means begin to contact the runway and cause noise and vibration which give an audible indication that the useful tread is expended. Unlike the self-rotating tires of the prior art, the tire of the present invention is easy to mold with conventional equipment. There are no flaps, interior voids, or water channels, each of which requires complex molds.

Figure 2:
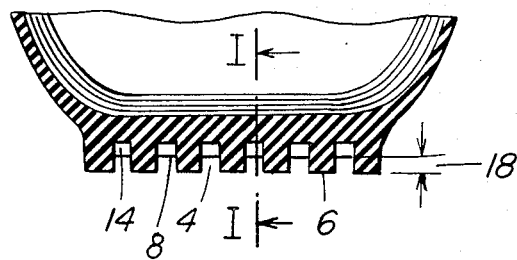

The invention will now be described in detail, with reference to the drawings wherein:

FIG. 1 illustrates a circumferential cross-section of a tire embodying a form of the invention taken along the plane I—I of FIG. 2; and FIG. 2 illustrates a radial cross-section of the embodiment of FIG. 1 taken along the plane II—II of FIG. 1.

In the embodiment illustrated in FIGS. 1 and 2, there is shown a tire 2 having a plurality of circumferential tread grooves 4. Within each groove, and forming the floor thereof, is a series of asymmetric wedges 8 of generally saw-tooth configuration, each of the wedges having a radially disposed face 14 and a longer sloping or tangential face 10. The apex 16 of each of the wedges lies in a circle having a radius R–1 less than the radius R–2 of the contact surface of the tread face 6, such that there is an annular gap 18 between the outermost apex portion 16 of the wedges and the tread face 6. The wedges are of a width corresponding to the width of the circumferential grooves 4. The longer face 10 of each wedge and the radial face 14 of the neighboring wedge together form a complementary wedge shaped recess or pocket 12. The radial faces 14 act as impeller vanes against which the airstream impinges with an appreciably greater momentum transfer than that at the vertically opposite longer sloping faces which present a lower air resistance aspect to the oncoming airstream.

In use, the tire is positioned with respect to the airstream such that the radial faces 14 of the wedges 8 are perpendicular to and face the airstream at the bottom of the tire, and the longer sloping faces 10 are presented generally parallel to the airstream at the top of the tire. Consequently, there is a greater impact pressure and greater momentum transfer resulting in a commensurately greater force at the radial face 14 at the bottom than at the face 10 at the top. This results in a differential of air resistance forces at vertically opposed locations which causes tire rotation in the direction of aircraft travel prior to touchdown. This rotation automatically begins when the landing gear is lowered into the airstream. The wheels gradually accelerate to a circumferential velocity which may be less than the landing velocity because of frictional losses, but is a useful fraction thereof. This gradual acceleration lessens the stresses on the tire and landing gear at the moment of touchdown. The airstream induced rotation reduces the initial deceleration lurch of the aircraft as well as tire wear, tire heat and landing gear stress. Under wet runway conditions, the radial faces 14 of the wedges 8 are acted upon by the water to reduce the sliding effect called aquaplaning. The wedges tend to keep the tire rotating as the aircraft rolls through water. The wedges 8 are spaced from the runway surface by the annular gap 18. The gap 18 diminishes as the tread 6 wears until the wedges 8 contact the runway. This wedge contact creates a noise which serves as an audible signal of the need to replace the now worn tire.

Although the preferred embodiment is described as having wedges with radial faces 14 and tangential faces 10, it is apparent that the wedge faces could depart from purely radial or tangential attitudes and could be of non-planar shapes. The particular face shapes chosen must be asymmetric to display differential air resistance between the diametrically opposed upper and lower portions of the tire to yield a rotational force.

I claim:

1. An airstream rotatable aircraft tire having a tread face including at least one circumferential groove, the groove wholly containing a plurality of fixed impeller vanes of an asymmetrical shape which presents differential resistance to the airstream to cause rotation, the radially outermost extent of said vanes being radially inward of the tread face.

2. The tire of claim 1, wherein said impeller vanes define the bottom of the groove.

3. The tire of claim 2 wherein the impeller vanes are in the general form of wedges having a generally radial face and a second face.

4. The tire of claim 3 wherein the second face slopes and extends from the generally radial face of one wedge toward the generally radial face of the adjacent wedge of the series of vanes.

5. The tire of claim 4 wherein the second face of a wedge intercepts the radially outermost extent of the generally radial face of that wedge and is generally perpendicular to the radially innermost extent of the generally radial face of the adjacent wedge.

6. The tire of claim 5 wherein said second face is longer than said generally radial face.

7. The tire of claim 6 wherein the tread face includes a plurality of said circumferential grooves.

8. The tire of claim 7 wherein the radial face and the second face are planar.

9. An aircraft tire with a tread face having at least one circumferential groove which includes fixed rotation imparting means which present differential resistance to the airstream at vertically opposed locations to induce rotation, the radially outermost extent of said fixed rotation imparting means being radially inward of the tread face.

* * * * *